(12) United States Patent
Miyazawa

(10) Patent No.: US 8,353,599 B2
(45) Date of Patent: Jan. 15, 2013

(54) PROJECTION SYSTEM AND PROJECTOR

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 728 days.

(21) Appl. No.: 12/262,848

(22) Filed: Oct. 31, 2008

(65) Prior Publication Data
US 2009/0147031 A1    Jun. 11, 2009

(30) Foreign Application Priority Data
Dec. 10, 2007   (JP) ................... 2007-317987

(51) Int. Cl.
G03B 21/00    (2006.01)
G03B 21/26    (2006.01)

(52) U.S. Cl. .......................... 353/94; 353/122
(58) Field of Classification Search ............ 353/7–8, 353/94, 122; 359/462, 464–466, 472, 475; 348/42–43, 51–52, 54–60; 382/154; 345/613, 345/694–696
See application file for complete search history.

(56) References Cited

U.S. PATENT DOCUMENTS

| | | | |
|---|---|---|---|
| 6,243,055 B1* | 6/2001 | Fergason ................. | 345/32 |
| 7,330,181 B2 | 2/2008 | Kuroki et al. | |
| 7,524,068 B2* | 4/2009 | Hayashi et al. ............. | 353/51 |
| 8,077,172 B2 | 12/2011 | Kuroki et al. | |
| 2003/0020809 A1* | 1/2003 | Gibbon et al. ............. | 348/51 |
| 2004/0207815 A1* | 10/2004 | Allen et al. ............... | 353/31 |
| 2006/0140511 A1* | 6/2006 | Chang et al. ............. | 382/298 |
| 2007/0097334 A1* | 5/2007 | Damera-Venkata et al. ... | 353/94 |
| 2008/0024518 A1* | 1/2008 | Hoffman et al. ........... | 345/611 |
| 2011/0090465 A1* | 4/2011 | Watanabe et al. ........... | 353/31 |
| 2011/0234650 A1* | 9/2011 | Watanabe ............... | 345/690 |

FOREIGN PATENT DOCUMENTS

| | | |
|---|---|---|
| JP | A-10-304284 | 11/1998 |
| JP | A-2002-091400 | 3/2002 |
| JP | A-2003-029238 | 1/2003 |
| JP | A-2004-205917 | 7/2004 |
| JP | A-2004-266808 | 9/2004 |
| JP | A-2006-203615 | 8/2006 |

* cited by examiner

Primary Examiner — Tony Ko
Assistant Examiner — Jori S Reilly-Diakun
(74) Attorney, Agent, or Firm — Oliff & Berridge, PLC

(57) ABSTRACT

A projection system includes: a first image forming unit which releases the first image light; a second image forming unit which releases the second image light; a polarization combining system which combines the first image light and the second image light; a projection unit which projects the first image light and second image light combined; a pixel shift control unit which controls a pixel shift unit; a display timing control unit which controls display timing; and an image display control unit having a function which controls the pixel shift control unit and a function which controls the display timing control unit. The image display control unit performs the pixel shifting control when the image is a still image, and performs at least display timing control out of the pixel shifting control and the display timing control when the image is a dynamic image.

11 Claims, 7 Drawing Sheets

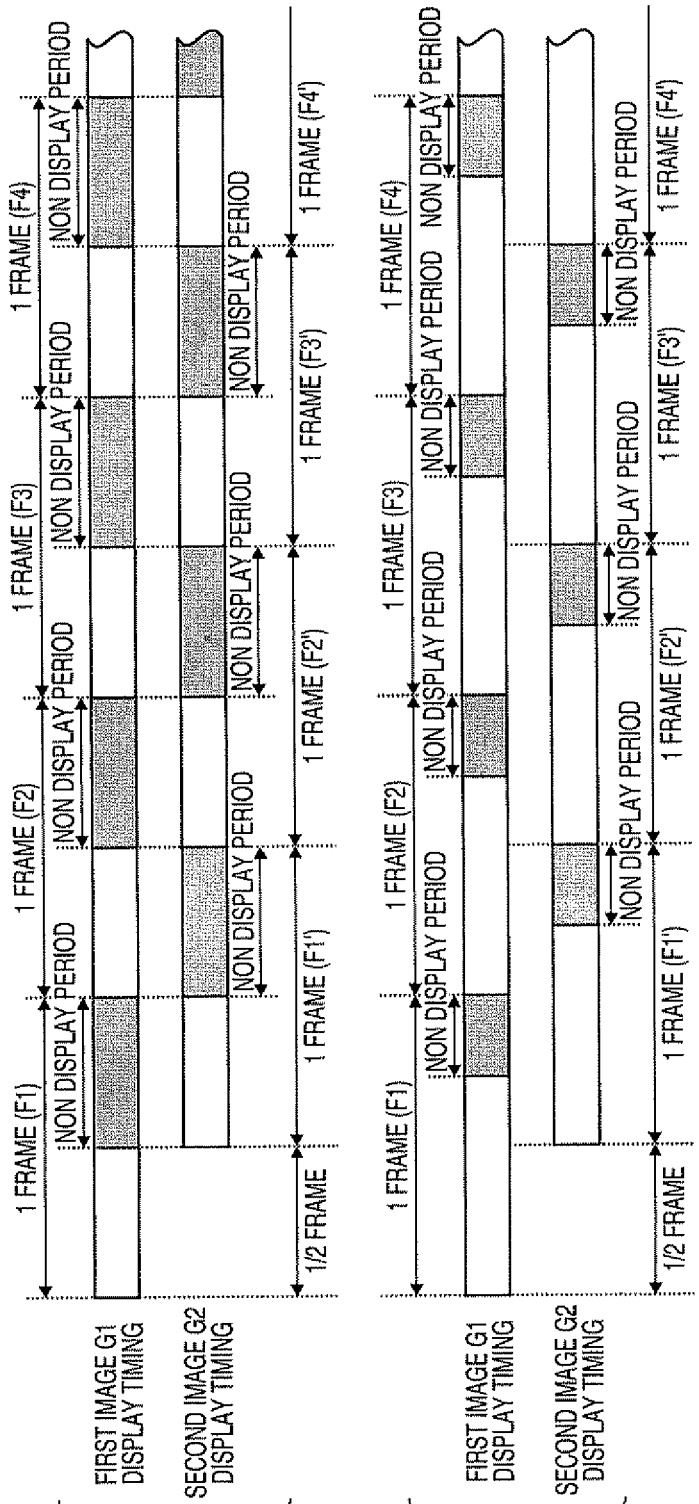
FIG. 6A
FIG. 6B
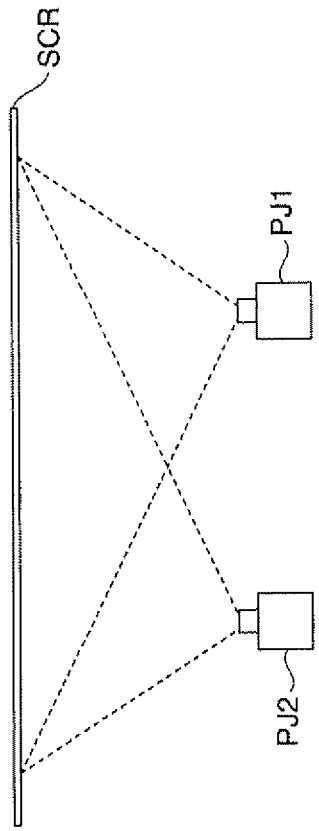
FIG. 7

PROJECTION SYSTEM AND PROJECTOR

BACKGROUND

1. Technical Field

The present invention relates to a projection system and a projector.

2. Related Art

A projector which can easily display large-screen images has been used in a broad application field such as a projection device for presentation, movie, and the like. Recently, resolution of an image input device such as a digital camera has been increasing, which can produce extremely fine images. However, resolution of a projector as an image output device for displaying the images produced by such an image input device having high resolution is lower than the resolution of the digital camera or the like. Moreover, according to a projector using liquid crystals as light modulation elements, the response speed of liquid crystals is relatively low, and thus visual recognizability of dynamic images needs to be improved.

Various technologies for overcoming these problems have been proposed (for example, see JP-A-10-304284 and JP-A-2006-203615). According to the method disclosed in JP-A-10-304284 (hereinafter referred to as first related art), highly fine image display can be achieved by shifting pixels on two images projected on a screen, that is, by so-called pixel shifting.

According to the method disclosed in JP-A-2006-203615 (hereinafter referred to as second related art), which is a technology for improving the visual recognizability of dynamic images, the visual recognizability can be increased by shifting the display timing of two projection images at the time of stack projection of projection image from plural projectors on a screen, that is, so-called synchronization shifting. Moreover, in the second related art, an intermediate image is produced based on image data to be displayed, and synchronization shifting is performed for the produced intermediate image by at least one of the plural projectors before projection. Thus, the visual recognizability of dynamic images improves.

According to the first related art, highly fine images can be displayed on the screen by performing pixel shifting for plural images. In the first related art, however, no consideration is given to improvement of visual recognizability of dynamic images. Thus, the problem of low visual recognizability of dynamic images cannot be solved.

On the other hand, the visual recognizability of dynamic images can be enhanced by synchronization shifting of the projection images projected by two projectors in the second related art. However, increase in the degree of fineness of images is not specifically considered, and thus no improvement over the fineness of image display can be achieved.

Which of pixel shifting and synchronization shifting is an appropriate method differs depending on the contents to be projected. For example, in case of still images, finer image display is typically desired. In case of dynamic images, highly recognizable dynamic display is typically desirable. It is therefore important to select pixel shifting or synchronization shifting according to the contents. In the first and second related arts, however, processing according to the contents is difficult.

SUMMARY

It is an advantage of some aspects of the invention to provide a projection system and a projector having both functions for performing highly fine image display by pixel shifting and highly recognizable dynamic image display by synchronization shifting, and further selecting appropriate functions according to the contents to be displayed.

A projection system according to a first aspect of the invention includes a projector constructed such that images corresponding to a first image light and a second image light can be stacked on a projection surface for display. The projector include: a first image forming unit and a second image forming unit which modulate lights emitted from a light source based on image data and releases the modulated image lights as the first image light and the second image light; a polarization combining system which combines the first image light and the second image light released from the first image forming unit and the second image forming unit; a projection unit which projects the first image light and second image light combined by the polarization combining system on the projection surface; a pixel shift control unit which controls a pixel shift unit for performing pixel shifting such that the respective images corresponding to the first image light and the second image light can be relatively shifted on the projection surface by a predetermined amount; a display timing control unit which controls display timing such that display timing of the respective images corresponding to the first image light and the second image light can be shifted by a predetermined period; and an image display control unit having a function which controls the pixel shift control unit and a function which controls the display timing control unit. The image display control unit performs the pixel shifting control for the pixel shift control unit when the image is a still image, and performs at least display timing control for the display timing control unit out of the pixel shifting control for the pixel shift control unit and the display timing control for the display timing control unit when the image is a dynamic image.

According to the projection system of the first aspect of the invention, the one projector has two image forming units and one projection system. The projector included in the projection system having this structure can achieve both highly fine image display by pixel shifting and improvement of visual recognizability of dynamic images by synchronization shifting. Moreover, these functions can be selected according to the contents to be displayed.

It is preferable that, when at least either the pixel shifting control for the pixel shift control unit or the display timing control for the display timing control unit is performed, at least either the pixel shifting control or the display timing control is conducted for the image forming unit which emits control target image light as either the first image light or the second image light in the projection system of the first aspect of the invention.

According to this structure, pixel shifting and display timing control can be efficiently performed. Since the pixel shift unit needs to be provided only one of the image forming units, the entire structure of the projector can be simplified.

It is preferable that the pixel shift unit has a mechanism which can displace the optical axis of the control target image light in the projection system of the first aspect of the invention.

According to this structure, the pixel shift unit does not perform image processing for the optical axis but optically displaces the optical axis. By using the pixel shift unit, the pixel shift amount can be easily set not only by one pixel but also by a value smaller than one pixel such as 0.5 pixel in the vertical and horizontal directions.

It is preferable that the predetermined period by which the display timing is shifted is set within a period corresponding to one frame of the image data in the projection system of the first aspect of the invention.

By setting the shift amount within a period corresponding to one frame of the image data, visual recognizability of dynamic images to be stacked on the projection surface for display can be improved.

It is preferable that non display period in which one of images corresponding to the first image light and the second image light is not displayed is provided within the period in which the frames corresponding to the image data for the respective images associated with the first image light and the second image light overlap with each other in the projection system of the first aspect of the invention.

According to this structure, image overlapping of the two images stacked with shifted display timing can be reduced in the corresponding frame. Thus, the image quality can be enhanced.

It is preferable that the non display time is set at the period in which the frames corresponding to the image data for the respective images overlap with each other in the projection system of the first aspect of the invention.

According to this structure, image overlapping of the two images stacked with shifted display timing can be eliminated in the corresponding frame. For example, when the shift amount of the display timing of the two images is ½ frame, only one of the two images is displayed in the corresponding frame. Thus, overlapping of the two images with shifted display timing can be eliminated in the corresponding frame. When the non display period is provided, brightness of the images to be stacked on the projection surface lowers in some cases. Thus, the method of setting the non display period in this manner is effective when the image quality of the images to be stacked is important.

It is preferable that the non display period is set at a period shorter than the period in which the frames corresponding to the image data for the respective images overlap with each other in the projection system of the first aspect of the invention.

By setting the non display period at a period shorter than the period in which the frames corresponding to the image data for the respective images overlap with each other, brightness of the images to be stacked increases. The method of setting the non display period in this manner is effective when priority is given to brightness of the images to be stacked.

It is preferable that the image display control unit has a function of controlling the output of the light source according to the length of the non display period in the projection system of the first aspect of the invention.

According to this structure, lowering of the brightness of the display image containing non display period can be prevented by the function of controlling the light amount of the light source according to the length of the non display period. When the light source output is increased for the purpose of preventing lowering of the brightness of the display image under the condition of presence of non display periods, a still image is displayed with the output of the light source remaining large after switching from the dynamic image to the still image under this condition. In this case, the still image to be displayed becomes brighter. Thus, there is a possibility that the brightness of the dynamic image in display is not equal to that of the still image in display. However, by using the function of controlling the output of the light source, the brightness of the dynamic image and that of the still image to be displayed become equivalent.

A projection system according to a second aspect of the invention includes a plurality of projectors disposed such that respective images projected by the plural projectors are stacked on a projection surface for display. At least one of the projectors includes a pixel shift control unit which controls a pixel shift unit for performing pixel shifting such that the respective images projected by the plural projectors can be relatively shifted on the projection surface by a predetermined amount, a display timing control unit which controls display timing such that display timing of the respective images projected by the plural projectors can be shifted by a predetermined period, and an image display control unit having a function which controls the pixel shift control unit and a function which controls the display timing control unit. The image display control unit performs the pixel shifting control for the pixel shift control unit when the image is a still image, and performs at least display timing control for the display timing control unit out of the pixel shifting control for the pixel shift control unit and the display timing control for the display timing control unit.

The projection system according to the second aspect of the invention includes the plural projectors, and at least one of the plural projectors constituting the projection system has this structure. Thus, the projector can achieve both highly fine image display by pixel shifting and improvement of visual recognizability of dynamic images by synchronization shifting. Moreover, these functions can be selected according to the images (contents) to be displayed. It is preferable that the projection system according to the second aspect of the invention has characteristics similar to those of the projection system according to the first aspect of the invention.

A projector constructed such that images corresponding to a first image light and a second image light can be stacked on a projection surface for display, wherein the projector according to a third aspect of the invention includes: a first image forming unit and a second image forming unit which modulates lights emitted from a light source based on image data and releases the modulated image lights as the first image light and the second image light; a polarization combining system which combines the first image light and the second image light released from the first image forming unit and the second image forming unit; a projection unit which projects the first image light and second image light combined by the polarization combining system on the projection surface; a pixel shift control unit which controls a pixel shift unit for performing pixel shifting such that the respective images corresponding to the first image light and the second image light can be relatively shifted on the projection surface by a predetermined amount; a display timing control unit which controls display timing such that display timing of the respective images corresponding to the first image light and the second image light can be shifted by a predetermined period; and an image display control unit having a function which controls the pixel shift control unit and a function which controls the display timing control unit. The image display control unit performs the pixel shifting control for the pixel shift control unit when the image is a still image, and performs at least display timing control for the display timing control unit out of the pixel shifting control for the pixel shift control unit and the display timing control for the display timing control unit when the image is a dynamic image.

According to this structure, the one projector has two image forming units and one projection system. The projector included in the projection system having this structure can achieve both highly fine image display by pixel shifting and improvement of visual recognizability of dynamic images by synchronization shifting as described above. Moreover, these functions can be selected according to the contents to be displayed.

BRIEF DESCRIPTION OF THE DRAWINGS

The invention will be described with reference to the accompanying drawings, wherein like numbers reference like elements.

FIGS. 6A and 6B show display timing of a first image G1 and a second image G2 on the screen SCR included in the high speed image data.

FIG. 7 illustrates a structure of a projection system according to a second embodiment.

DESCRIPTION OF EXEMPLARY EMBODIMENTS

Embodiments according to the invention are hereinafter described with reference to the drawings.

First Embodiment

Figure 1:
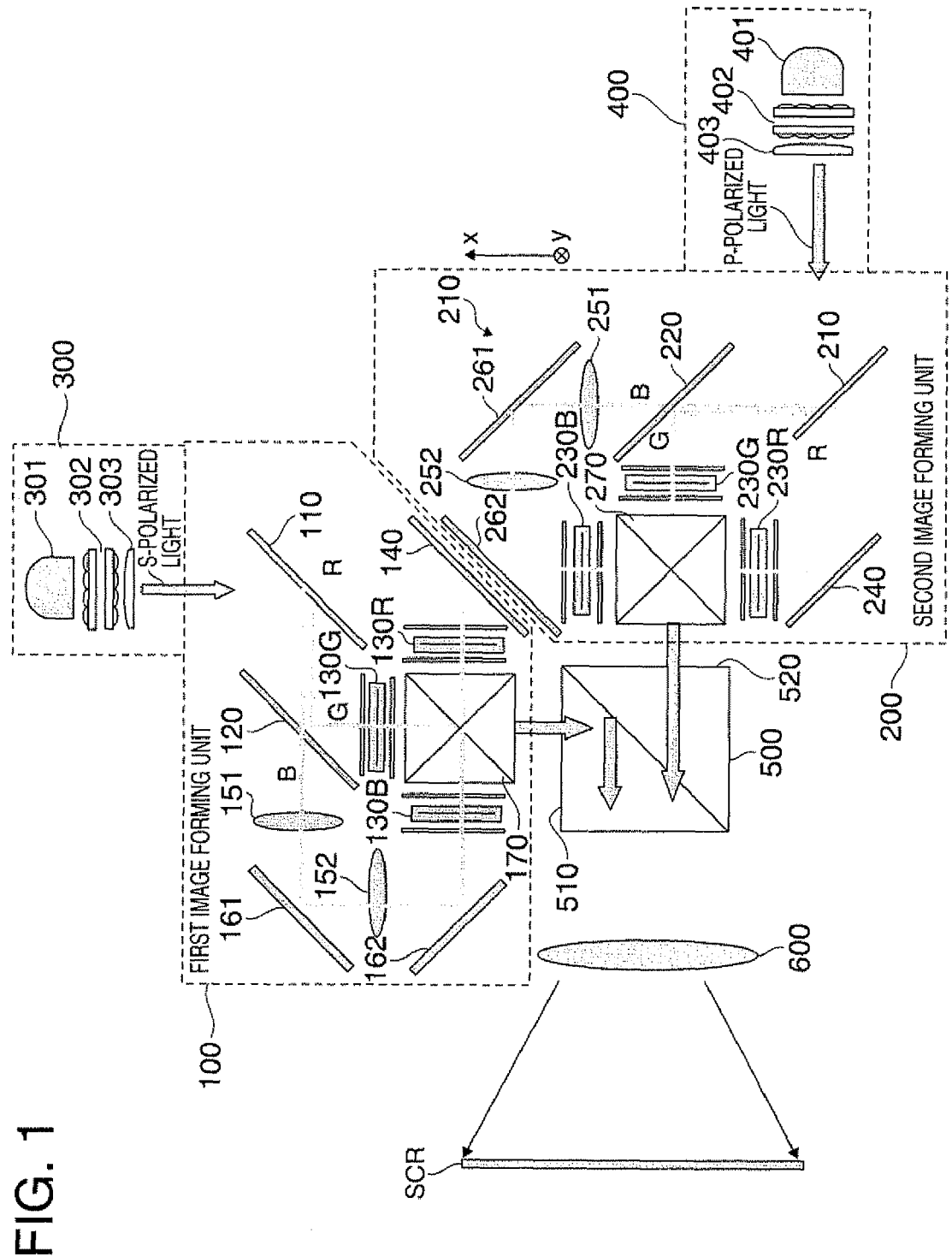
FIG. 1 schematically illustrates optical systems included in a projector according to a first embodiment of the invention.

FIG. 1 schematically illustrates optical systems of a projector included in a projection system according to a first embodiment. As illustrated in FIG. 1, the projector incorporated in the projection system in the first embodiment of the invention (hereinafter abbreviated as "projector according to the first embodiment") includes image forming units 100 and 200 as two system image forming units (hereinafter referred to as first image forming unit 100 and second image forming unit 200), a first light source device 300 and a second light source device 400 provided in correspondence with the first image forming unit 100 and second image forming unit 200, a polarization combining prism 500 as a polarization combining system for combining image lights (hereinafter referred to as first image light and second image light) emitted from the first image forming unit 100 and the second image forming unit 200, and a projection unit 600 for projecting the image light combined by the polarization combining prism 500 onto a screen SCR as a projection surface.

In this specification, the projector having the structure shown in FIG. 1 is referred to as "projector including two system image forming units and one projection system".

The first light source device 300 has a light source 301, a lens array 302, and a superimposing lens 303, and outputs light having first polarization component (such as S-polarized light). The second light source device 400 has a structure similar to that of the first light source device 300, that is, has a light source 401, a lens array 402, and a superimposing lens 403, and outputs light having second polarization component (such as P-polarized light). The first light source device 300 and the second light source device 400 may share some structures.

The first image forming unit 100 includes a first dichroic mirror 110 which separates light emitted from the first light source device 300 into red light (R) and lights of green light (G) and blue light (B), a second dichroic mirror 120 which separates the green light (G) and blue light (B) separated by the first dichroic mirror 110 into green light and blue light, a first light modulation element (light crystal panel) 130R which modulates red light separated by the first dichroic mirror 110 based on image data, a second light modulation element (liquid crystal panel) 130G which modulates green light separated by the second dichroic mirror 120 based on image data, a third light modulation element (liquid crystal panel) 130B which modulates blue light separated by the second dichroic mirror 120 based on image data, a reflection mirror 140 which guides the red light separated by the first dichroic mirror 110 to the light modulation element 130R, relay lenses 151 and 152 and reflection mirrors 161 and 162 which guide the blue light separated by the second dichroic mirror 120 to the light modulation element 130B, and a first cross dichroic prism 170 which combines the lights modulated by the first through third modulation elements 130R, 130G, and 130B.

The first image light having the first polarization component is emitted from the first image forming unit 100 having this structure, and enters a first image light entrance surface 510 of the polarization combining prism 500.

The second image forming unit 200 has a structure similar to that of the first image forming unit 100. More specifically, the second image forming unit 200 includes a first dichroic mirror 210 which separates light emitted from the second light source device 400 into red light (R) and lights of green light (G) and blue light (B), a second dichroic mirror 220 which separates the green light (G) and blue light (B) separated by the first dichroic mirror 210 into green light and blue light, a fourth light modulation element (light crystal panel) 230R which modulates red light separated by the first dichroic mirror 210 based on image data, a fifth light modulation element (liquid crystal panel) 230G which modulates green light separated by the second dichroic mirror 220 based on image data, a sixth light modulation element (liquid crystal panel) 230B which modulates blue light separated by the second dichroic mirror 220 based on image data, a reflection mirror 240 which guides the red light separated by the first dichroic mirror 210 to the fourth light modulation element 230R, relay lenses 251 and 252 and reflection mirrors 261 and 262 which guide the blue light separated by the second dichroic mirror 220 to the sixth light modulation element 230B, and a second cross dichroic prism 270 which combines the lights modulated by the fourth through sixth modulation elements 230R, 230G, and 230B.

The second image light having the second polarization component is emitted from the second image forming unit 200 having this structure, and enters a second image light entrance surface 520 of the polarization combining prism 500.

The polarization combining prism 500 combines the first image light having entered the first image light entrance surface 510 and the second image light having entered the second image light entrance surface 520. The image light combined by the polarization combining prism 500 is projected on the screen SCR by the projection unit 600, and respective images formed by the first image light (first image) corresponding to the first image light and the second image light (second image) corresponding to the second image light are stacked on the screen SCR for display.

The projector according to the first embodiment has a mechanism which reciprocates in a predetermined range along two axes (x and y axes in the figure) orthogonal to an optical stage (not shown) to which the second image forming unit 200 and the second light source device 400 are attached as a pixel shift unit. In this example, the x axis corresponds to the up-down direction in FIG. 1, and the y axis corresponds to the direction perpendicular to the surface of FIG. 1. The second image forming unit 200 and the second light source device 400 shift as one body, and actually both are movable. In the following description, however, only the movement of the second image forming unit 200 is discussed, and the movement of the second light source device 400 is not touched upon.

As described, the second image forming unit 200 reciprocates in the predetermined range along the two axes (x and y axes) orthogonal to each other. Thus, the size of the polarization combining prism 500 is so determined as to correspond to the shift range of the second image forming unit 200.

Figure 2:
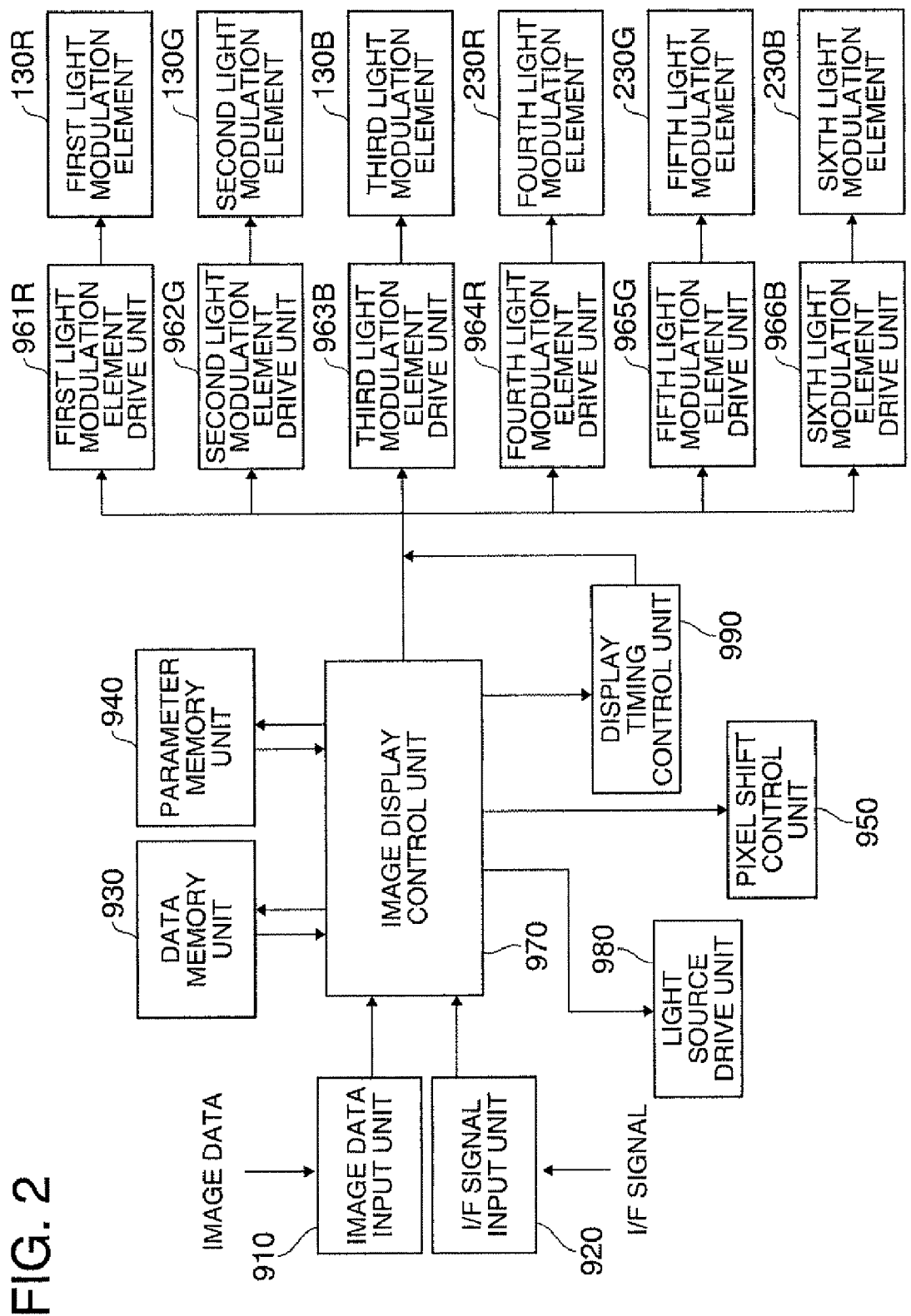
FIG. 2 shows functions of the projector according to the first embodiment.

FIG. 2 shows the structure of the functions of the projector according to the first embodiment. As illustrated in FIG. 2, the projector in the first embodiment includes an image data input unit 910 to which image data corresponding to an image to be displayed, an I/F signal input unit 920 through which various types of interface signal (I/F signal) such as command and setting given by the user, a data memory unit 930 which stores various data or the like necessary for projecting image data to be displayed, a parameter memory unit 940 which stores various parameters used for correction or other processes, a pixel shift control unit 950 which performs drive control for shifting the second image forming unit 200 along the x or y axis, first through third light modulation element drive units 961R, 962G, and 963B for driving the first through third light modulation elements 130R, 130G, and 130B of the first image forming unit 100, fourth through sixth light modulation element drive units 964R, 965G, and 966B for driving the fourth through sixth light modulation elements 230R, 230G, and 230B of the second image forming unit 200, an image display control unit 970 which performs overall processes such as production of image data given to the respective light modulation elements and correction, a light source drive unit 980 which drives the light sources 301 and 302, and a display timing control unit 990 which performs control for shifting display timing such that each display timing of the images corresponding to the first image light and the second image light can be shifted by predetermined period.

The image display control unit 970 has a function of outputting a control signal for pixel shifting to the control unit 950, a function of outputting a control signal for controlling each display timing of the first image corresponding to the first image light and the second image corresponding to the second image light to the display timing control unit 990, and a function of outputting a control signal for controlling light source output (brightness) to the light source drive unit 980.

Thus, the projector according to the first embodiment having the two system image forming units and one projection system increases the degree of fineness of images stacked on the screen SCR for display (particularly, still images become extremely fine) and improves visual recognizability of dynamic images when the projection images are dynamic images.

Initially, increase in the degree of fineness of still images is discussed. In the projector according to the first embodiment, pixel shifting is performed when the first image and the second image are stacked on the screen SCR for display. More specifically, pixels on the second image are shifted from those on the first image by ½ pixel for each on the screen in the horizontal direction and vertical direction.

Figure 3A:
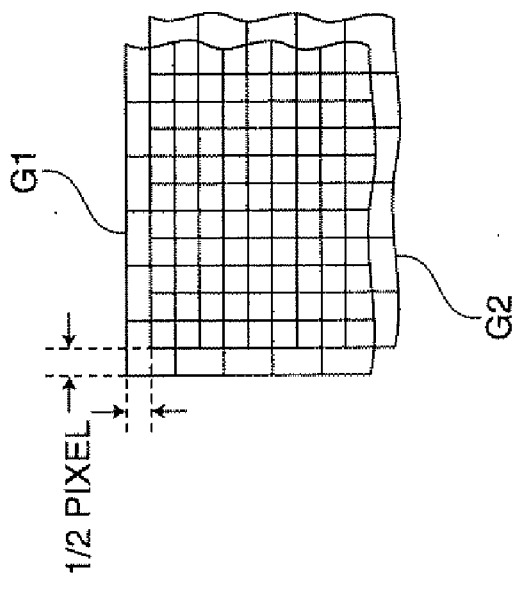
FIGS. 3A and 3B schematically illustrate pixel shifting in a projection system according to the first embodiment of the invention.
Figure 3B:
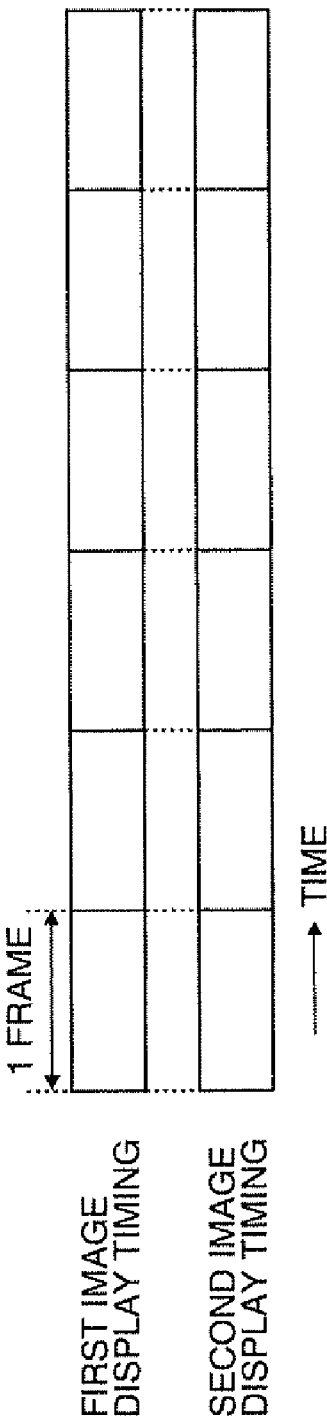

FIGS. 3A and 3B schematically illustrate pixel shifting according to the projection system in the first embodiment. FIG. 3A schematically illustrates correlation between a first image G1 corresponding to the first image light and a second image G2 corresponding to the second image light on the screen SCR. FIG. 3B shows display timing of the first image G1 and the second image G2 on the screen SCR. The squares shown in FIG. 3A represent respective areas corresponding to the respective pixels of the light modulation element. In FIG. 3A, the area shown in gray represents a certain square in the first and second images G1 and G2.

As illustrated in FIG. 3A, each pixel of the second image G2 is shifted from each pixel of the first image G1 by ½ pixel in the horizontal direction and vertical direction. In case of the still image, the display timing of the first image G1 and the second image G2 on the screen SCR is synchronized for each corresponding frame as illustrated in FIG. 3B.

According to the projector in the first embodiment, pixel shifting is performed when the image to be displayed is a still image. It is possible to automatically judge whether the image to be displayed is a still image or not based on image data inputted to the image data input unit 910 by the function of the image display control unit 970. Alternatively, when the user inputs information showing that the image to be displayed is a still image through the I/F signal input unit 920, this judgment may be made by the image display control unit 970 based on the input information.

When the image to be displayed is a still image, the image display control unit 970 transmits a control signal for performing pixel shifting to the pixel shift control unit 950. Then, the pixel shift control unit 950 shifts the second image forming unit 200 in a predetermined direction by a predetermined amount. Thus, the pixels of the second image G2 corresponding to those of the first image G1 are shifted by the predetermined amount (½ pixel in this example) with respect to the first image G1.

FIG. 3A shows the condition in which the second image G2 is shifted from the first image G1 by ½ pixel in the horizontal (x axis) direction and vertical (y axis) direction. By projecting the first image G1 and the second image G2 after pixel shifting at the time of stack display of those images G1 and G2 on the screen SCR, the images become highly fine. When the pixel shifting is performed, the image display control unit 970 transmits image data adjusted to the pixel shifting to the corresponding light modulation elements.

At the time of pixel shifting, the shift amount and shift direction of the second image forming unit 200 may be automatically set based on the information set in advance, or may be set by the user.

When the image to be displayed is a dynamic image, the process for shifting each display timing of the first image G1 and the second image G2 on the screen SCR (synchronization shifting) is performed to improve visual recognizability of the dynamic image. According to the projection system in the first embodiment, pixel shifting is not conducted in case of dynamic image. Also, according to the projection system in the first embodiment, the shift amount of the display timing is set within the period corresponding to one frame of the image data.

Figure 4A:
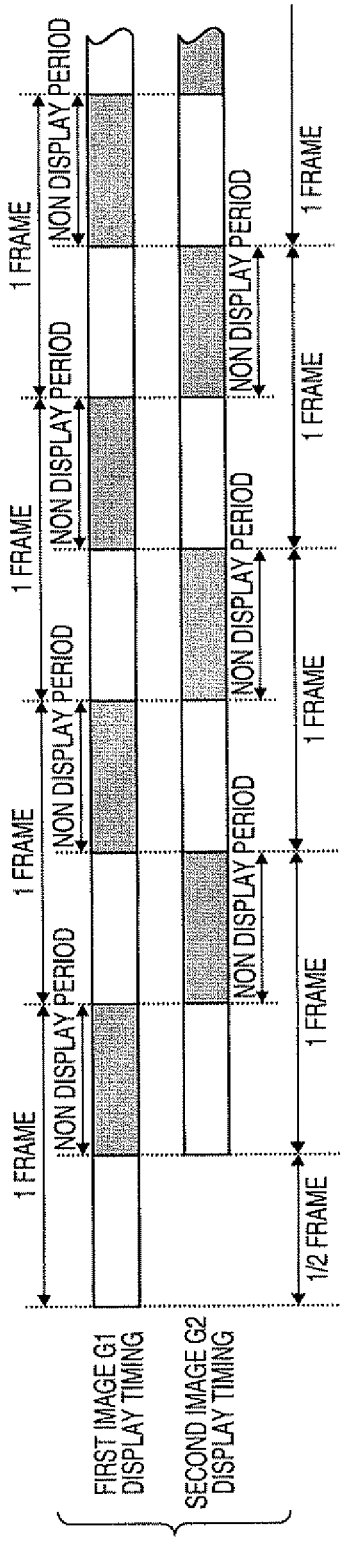
FIGS. 4A and 4B show display timing of a first image and a second image on a screen SCR.
Figure 4B:
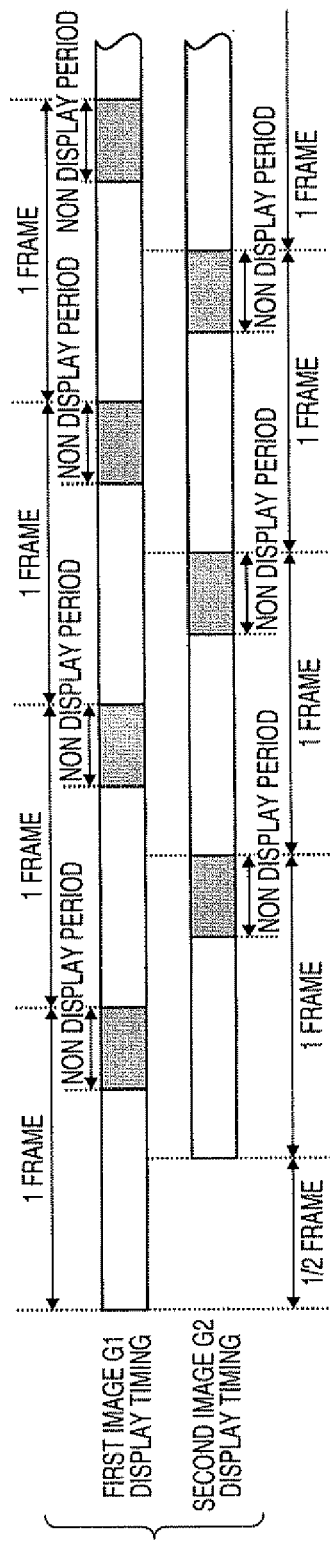

FIGS. 4A and 4B illustrate each display timing of the first image G1 and the second image G2 on the screen SCR. FIGS. 4A and 4B show an example in which the shift amount of the first image G1 from the second image G2 is set at ½ frame. The areas shown in gray in FIGS. 4A and 4B represent periods not displaying image (non display periods). The non display periods can be set by blocking the first image light and the second image light for a predetermined period.

By setting the non display periods shown in FIGS. 4A and 4B, overlapping of the corresponding frames in the time-shifted condition can be prevented at the time of synchronization shifting. Thus, the image quality after synchronization shifting can be improved. The non display periods may be formed by blocking the first image light or the second image light by using a light blocking plate only for the corresponding non-display period. Alternatively, when the light source is a solid light source such as LED, the solid light source may be intermittently driven (turned off only in image non display periods), or black images may be inserted by image processing.

By providing non display periods shown in FIGS. 4A and 4B, the brightness of the image displayed on the screen SCR is lower than that of the image not containing non display periods. There is a method for preventing this lowering of brightness by increasing the output intensity of the light source. The control of the light source control can be performed by controlling the light source drive unit 980 by the function of the image display control unit 970.

When the light source output is increased for the purpose of preventing lowering of the brightness of the display image under the condition of presence of non display periods, a still image is displayed with the output of the light source remaining large after switching from the dynamic image to the still image under the same condition. In this case, the still image to be displayed becomes brighter. Thus, there is a possibility that the brightness of the dynamic image in display is not equal to that of the still image in display.

In this condition, it is possible to lower the output of the light source. By this process, the brightness of the dynamic image and that of the still image to be displayed become equivalent even when the still image is displayed after synchronization shifting. When the display of still image is completely separated from the display of dynamic image, the process for equalizing the brightness is not necessary in some cases.

The lengths of the non display periods are different in FIGS. 4A and 4B. The lengths of the non display periods are adjusted to predetermined lengths within the overlapping time of the first image G1 and the second image G2 in display in the corresponding frames of the image data. According to the projection system in the first embodiment, the shift amount of the display timing is set at ½ frame. Thus, the overlapping time of the first image G1 and the second image G2 for each frame is ½ frame.

In case of FIG. 4A, the period corresponding to the shift amount of the display timing, that is, the period corresponding to ½ frame is the non display period. Thus, under the condition shown in FIG. 4A, the second image G2 is displayed during the non display period of the first image G1 in the corresponding frame, and the first image G1 is displayed during the non display period of the second image G2 in the corresponding frame. Thus, either the first image G1 or the second image G2 is displayed.

On the other hand, in case of FIG. 4B, a period shorter than the period corresponding to the shift amount of the display timing is determined as the non display period. Thus, under the condition shown in FIG. 4B, the period for displaying both the first image G1 and the second image G2 exists in the corresponding frame.

When the non display periods are provided in the manner shown in FIG. 4A, image giving priority to the image quality can be displayed. On the other hand, when the non display periods are provided in the manner shown in FIG. 4B, image giving priority to the brightness can be displayed. Thus, by appropriately setting the non display periods, images can be produced in the desired condition. The non display periods can be set by giving information about non display periods to the I/F signal input unit 920.

The synchronization shifting shown in FIGS. 4A and 4B are particularly effective when the image data to be displayed (image data to be inputted to the image data input unit 910) is image data (high speed image data) corresponding to a device capable of reproducing at a frame rate (60 frame/sec) twice higher than the normal frame rate (30 frame/sec) (high speed reproduction device). According to the projector in this embodiment used in the projection system or the like, reproduction at the frame rate of 30 frame/sec can be attained.

Figure 5:
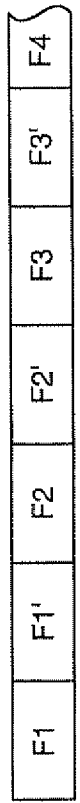
FIG. 5 shows a structure example of high speed image data.

FIG. 5 shows a structure example of high speed image data. As can be seen from FIG. 5, frames F1', F2', F3', and so on as intermediate images are inserted between the frames F1, F2, F3, and so on, respectively. In an image reproduction device performing reproduction at the normal frame rate, the frames F1, F2, F3, and so on are reproduced. In the high speed reproduction device, the frames F1, F1', F2, F2', and so on are reproduced.

When the high speed image data shown in FIG. 5 are inputted to the image data input unit 910 shown in FIG. 1, the image display control unit 970 gives the frames F1, F2, F3, and so on to the first image forming unit 100, and gives the frames F1', F2', F3', and so on to the second image forming unit 200. Then, the first image light corresponding to the frames F1, F2, F3, and so on is emitted from the first image forming unit 100, and the second image light corresponding to the frames F1', F2', F3', and so on is emitted from the second image forming unit 200.

The image display control unit 970 controls the first image G1 such that the display timing of the second image G2 corresponding to the second image light is shifted from the first image G1 corresponding to the first image light by ½ frame. It is preferable that the first image G1 and the second image G2 have non display periods shown in FIGS. 6A and 6B.

FIG. 6A shows the case in which the period corresponding to the shift amount of the display timing (period corresponding to ½ frame) is set as the non display period as shown in FIG. 4A. FIG. 6B shows the case in which a period shorter than the period corresponding to the shift amount of the display timing is set as the non display period as shown in FIG. 4B. By providing the non display periods shown in FIG. 6A, image giving priority to image quality can be displayed as explained in case of FIG. 4A. On the other hand, by providing the non display periods shown in FIG. 6B, image giving priority to brightness can be displayed as explained in case of FIG. 4B.

According to the projector in the first embodiment capable of reproducing at the frame rate of 60 frame/sec can display images converted into those at 120 frame/sec or 180 frame/sec by image processing. In this case, visual recognizability of dynamic images can be further improved.

According to the projection system in the first embodiment having two system image forming units and one projection system, pixel shifting is performed such that the first image G1 corresponding to the first image light and the second image G2 corresponding to the second image light emitted from the two system image forming units (first image forming unit 100 and the second image forming unit 200) are shifted from each other by ½ pixel on the screen SCR when images to be displayed are still image. On the other hand, when images to be displayed are dynamic images, the display timing of the first image G1 is shifted from that of the second image G2 by ½ frame. Thus, highly fine image display can be achieved in case of still images, and highly visual recognition can be achieved in case of dynamic images.

Second Embodiment

A projection system according to a second embodiment stacks two images projected from two projectors on a screen for display.

FIG. 7 illustrates the projection system according to the second embodiment. As shown in FIG. 7, the projection system in the second embodiment is constructed such that images projected from first and second projectors PJ1 and PJ2 can be stacked on the screen SCR. It is assumed that pixel shifting and synchronization shifting are performed on the projection PJ1 side in case of the projection system shown in FIG. 7.

Figure 8:
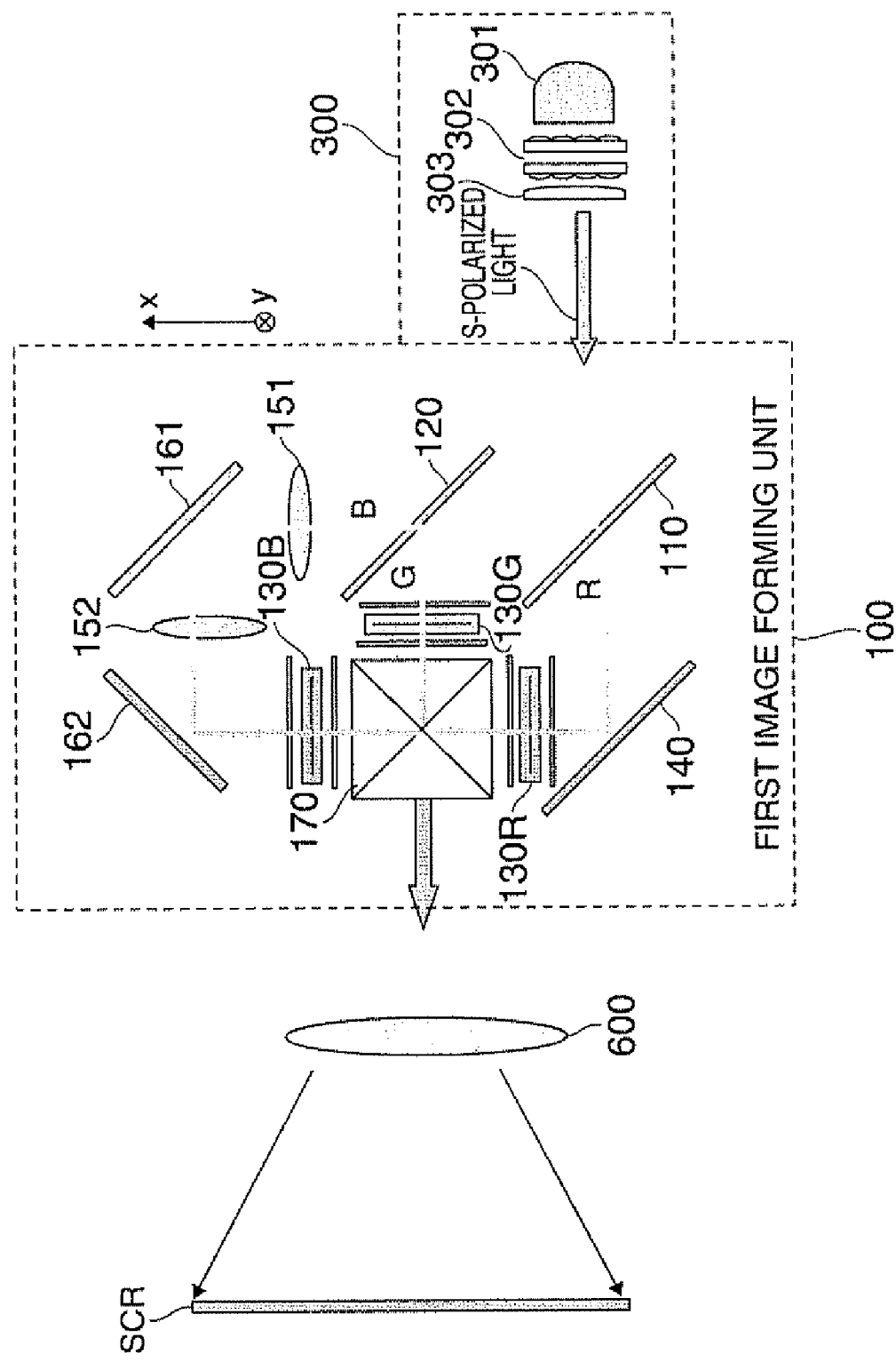
FIG. 8 schematically illustrates optical systems included in a projector PJ1 in the second embodiment.

FIG. 8 schematically illustrates optical systems included in the projector PJ1 of the projection system according to the second embodiment. As illustrated in FIG. 8, the projector PJ1 used in the projection system in the second embodiment (hereinafter referred to as projector PJ1 in the second embodiment) includes the image forming unit 100, the light source device 300, the projection unit 600 which projects image light emitted from the image forming unit 100 on the screen SCR. The image forming unit 100 in this embodiment corresponds to the first image forming unit 100 included in the projector according to the first embodiment (see FIG. 1), and has a structure substantially similar to that of the first image forming unit 100. Thus, the explanation of this structure is not repeated. The pixel shift unit included in the projector PJ1 is a mechanism capable of reciprocating in a predetermined range along two axes (x and y axes shown in the figure) orthogonal to an optical stage (not shown) to which the image forming unit 100 and the light source device 300 are attached.

Figure 9:
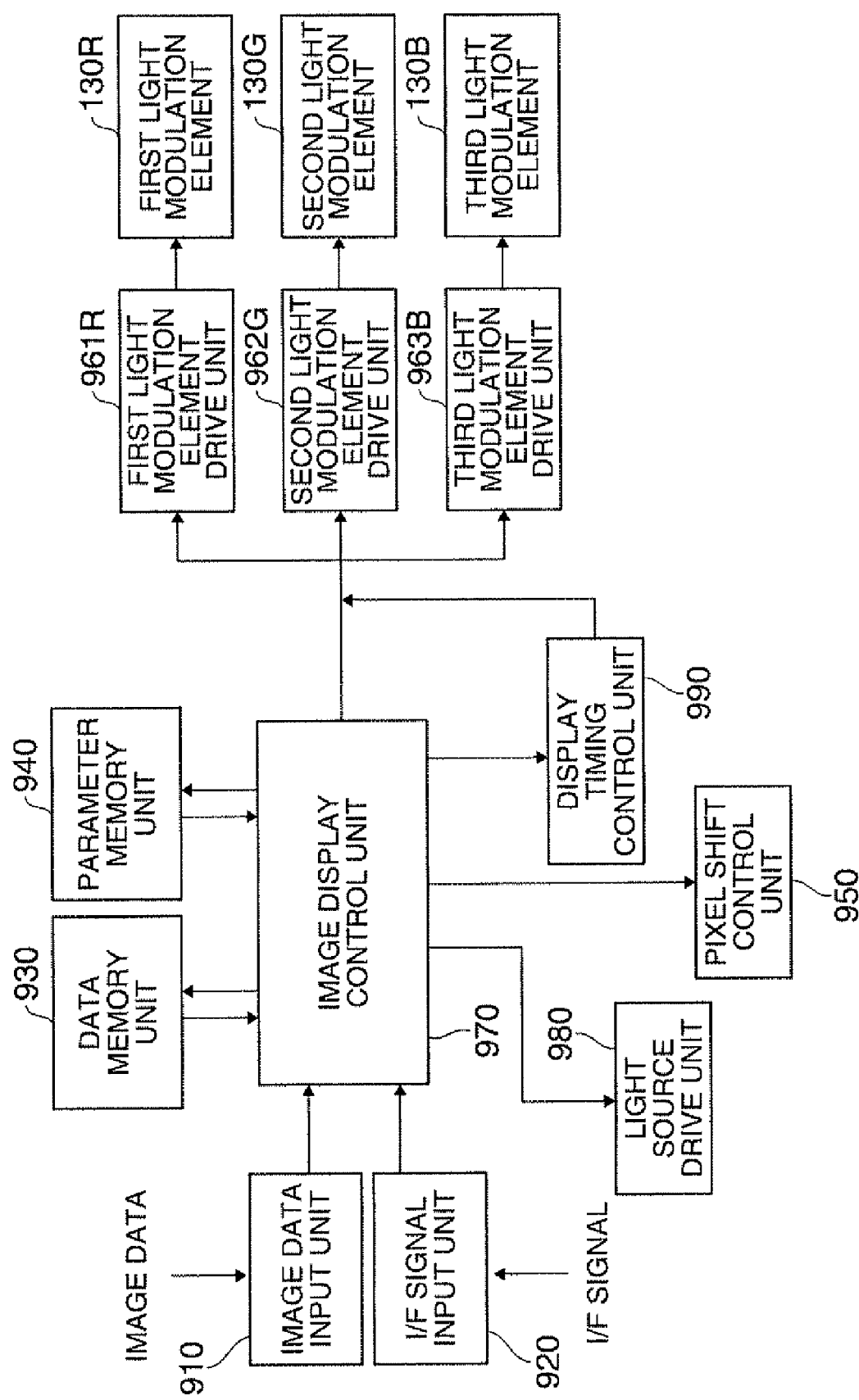
FIG. 9 shows functions of the projector PJ1.

FIG. 9 shows functions of the projector PJ1 according to the second embodiment. The projector PJ1 has a structure substantially similar to that shown in FIG. 2. More specifically, the projector PJ1 includes the image data input unit 910, the I/F signal input unit 920, the data memory unit 930, the parameter memory unit 940, the pixel shift control unit 950 which drives the pixel shift unit, the first through third light modulation element drive units 961R, 962G, and 963B for driving the first through third light modulation elements 130R, 130G, and 130B of the first image forming unit 100, the image display control unit 970 which performs overall processes, the light source drive unit 980 which drives the light source 301, and the display timing control unit 990 which controls image display timing for projection of images by the projector PJ1 such that each display timing of the images projected from the first and second projectors PJ1 and PJ2 can be shifted by predetermined period.

The image display control unit 970 has a function of outputting a control signal for shifting pixels on the image projected by the projector PJ1 from pixels on the image projected by the projector PJ2 to the control unit 950, a function of outputting a control signal for controlling each display timing of the image projected by the projector PJ1 to the display timing control unit 990, and a function of outputting a control signal for controlling light source output (brightness) to the light source drive unit 980.

The projection system in the second embodiment having this structure can perform pixel shifting and synchronization shifting similar to those performed by the projection system according to the first embodiment.

More specifically, in the projection system of the second embodiment, pixel shifting is performed by the projector PJ1 such that the respective images projected by the two projectors PJ1 and PJ2 are shifted by ½ pixel on the screen SCR when images to be displayed are still images. On the other hand, display timing control is performed by the projector PJ1 such that the display timing of the respective images projected by the two projectors PJ1 and PJ2 are shifted by ½ frame when images to be displayed are dynamic images. Thus, highly fine image display can be achieved in case of still images, and highly visual recognizability can be achieved in case of dynamic images. The controls over pixel shifting and display timing in the projection system in the second embodiment are similar to those of the projection system in the first embodiment, and the same explanation is not repeated.

The number of the projectors included in the projection system in the second embodiment may be three or larger. Even for images projected from three or more projectors, pixel shifting and synchronization shifting can be performed according to images to be displayed in the same manner as in the above embodiments.

The invention is not limited to the embodiments described and depicted herein. It is thus intended that the following modifications may be made without departing from the scope of the invention.

In the above embodiments, high speed image data is inputted to the image data input unit 910 when image data corresponding to dynamic images are high speed image data (see FIG. 5). However, the following method may be employed. Initially, image data which assumes display by an ordinary reproduction device (such as reproduction device capable of reproducing at the frame rate of 30 frame/sec) is inputted. Then, intermediate images are formed by the image display control unit 970 to produce high speed image data shown in FIG. 5. Thereafter, display timing control shown in FIGS. 6A and 6B is performed for the produced high speed image data.

While image data at the twice higher speed has been used as high speed image data in the example shown in FIG. 5 and FIGS. 6A and 6B, the image data speed may be three times higher or a larger number of times higher.

According to the embodiments, either pixel shifting or synchronization shifting is selected according to the types of images to be displayed, that is, whether the images are still or dynamic. When a still image containing no movement is included in a dynamic image and continued for a certain period, pixel shifting may be performed for the corresponding part of the still image to display a highly fine image. As in this case, pixel shifting or synchronization shifting may be selectively performed within a part of the contents.

According to the projector in the embodiments, only synchronization shifting is performed instead of pixel shifting in case of dynamic images. However, both pixel shifting and synchronization shifting may be conducted.

According to the embodiments, the mechanism capable of shifting the image forming unit and the light source device is used as a unit for performing pixel shifting. However, various types of units known in the art may be employed. For example, such a unit which displaces the optical axis of image light as control target by using glass plate may be used.

While liquid crystals are used as the light modulation element in the embodiments, micro mirror type light modulation element may be employed.

The entire disclosure of Japanese Patent Application No. 2007-317987, filed Dec. 10, 2007 is expressly incorporated by reference herein.

What is claimed is:

1. A projection system constructed such that respective images corresponding to a first image light and a second image light can be stacked on a projection surface for display, comprising:

a first image forming unit which modulates light emitted from a light source based on image data and releases the modulated image light as the first image light;

a second image forming unit which modulates light emitted from the light source based on image data and releases the modulated image light as the second image light;

a polarization combining system which combines the first image light released from the first image forming unit and the second image light released from the second image forming unit;

a projection unit which projects the first image light and second image light combined by the polarization combining system on the projection surface;

a pixel shift control unit which controls a pixel shift unit configured to perform pixel shifting such that the respective images corresponding to the first image light and the second image light can be relatively shifted on the projection surface by a predetermined amount with respect to each other;

a display timing control unit which controls display timing such that display timing of the respective images corresponding to the first image light and the second image light can be shifted by a predetermined period; and an image display control unit configured to judge whether the respective images corresponding to the first image light and the second image light are still images or dynamic images and also configured to control, based at least partly on the judgment of the image display control unit, the pixel shift control unit and the display timing control unit, wherein the image display control unit is configured to perform only pixel shifting control for the pixel shift control unit, only display timing control for the display timing control unit, and both the pixel shifting control for the pixel shift control unit and the display timing control for the display timing control unit, and wherein the image display control unit is configured to perform the pixel shifting control for the pixel shift control unit when the respective images corresponding to the first image light and the second image light are still images, and is configured to perform at least display timing control for the display timing control unit when the respective images are dynamic images.

2. The projection system according to claim 1, wherein the predetermined period by which the display timing is shifted is set within a period corresponding to one frame of the image data.

3. The projection system according to claim 2, wherein a non display period in which one of images corresponding to the first image light and the second image light is not displayed is provided within the period in which the frames corresponding to the image data for the respective images associated with the first image light and the second image light overlap with each other.

4. The projection system according to claim 3, wherein the non display time is set at the period in which the frames corresponding to the image data for the respective images overlap with each other.

5. The projection system according to claim 3, wherein the non display period is set at a period shorter than the period in which the frames corresponding to the image data for the respective images overlap with each other.

6. The projection system according to claim 3, wherein the image display control unit has a function of controlling the output of the light source according to the length of the non display period.

7. A projection system, comprising:

a plurality of projectors disposed such that respective images projected by the plural projectors are stacked on a projection surface for display, wherein at least one of the projectors includes:

a pixel shift control unit which controls a pixel shift unit configured to perform pixel shifting such that the respective images projected by the plural projectors can be relatively shifted on the projection surface by a predetermined amount with respect to each other;

a display timing control unit which controls display timing such that display timing of the respective images projected by the plural projectors can be shifted by a predetermined period; and an image display control unit configured to judge whether the respective images projected by the plural projectors are still images or dynamic images and also configured to control, based at least partly on the judgment of the image display control unit, the pixel shift control unit and the display timing control unit, wherein the image display control unit is configured to perform only pixel shifting control for the pixel shift control unit, only display timing control for the display timing control unit, and both the pixel shifting control for the pixel shift control unit and the display timing control for the display timing control unit, and wherein the image display control unit is configured to perform the pixel shifting control for the pixel shift control unit when the respective images projected by the plural projectors are still images, and is configured to perform at least display timing control for the display timing control unit when the respective images are dynamic images.

8. The projection system according to claim 1, wherein when at least either the pixel shifting control for the pixel shift control unit or the display timing control for the display timing control unit is performed, at least either the pixel shifting control or the display timing control is conducted for the image forming unit which emits control target image light as either the first image light or the second image light.

9. The projection system according to claim 8, wherein the pixel shift unit has a mechanism which can displace the optical axis of the control target image light.

10. A method for operating a projection system, the method comprising:

projecting respective images such that the respective images are stacked on a projection surface for display;

controlling pixel shifting such that the respective images can be relatively shifted on the projection surface by a predetermined amount with respect to each other;

controlling display timing such that display timing of the respective images can be shifted by a predetermined period;

judging whether the respective images are still images or dynamic images and controlling, based at least partly on the judgment, the pixel shifting and the display timing; and performing pixel shifting control when the image is a still image, and performing at least display timing control when the image is a dynamic image.

11. A non-transitory computer-readable medium storing a program configured to control a projection system, the program causing the projection system to execute the steps of:
projecting respective images such that the respective images are stacked on a projection surface for display;
controlling pixel shifting such that the respective images can be relatively shifted on the projection surface by a predetermined amount with respect to each other;
controlling display timing such that display timing of the respective images can be shifted by a predetermined period;
judging whether the respective images are still images or dynamic images and controlling, based at least partly on the judgment, the pixel shifting and the display timing; and
performing pixel shifting control when the image is a still image, and performing at least display timing control when the image is a dynamic image.

* * * * *

UNITED STATES PATENT AND TRADEMARK OFFICE
CERTIFICATE OF CORRECTION

| | | |
|---|---|---|
| PATENT NO. | : 8,353,599 B2 | Page 1 of 1 |
| APPLICATION NO. | : 12/262848 | |
| DATED | : January 15, 2013 | |
| INVENTOR(S) | : Miyazawa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this
Eleventh Day of November, 2014

Michelle K. Lee
*Deputy Director of the United States Patent and Trademark Office*